United States Patent
Hofford

(10) Patent No.: US 8,407,169 B2
(45) Date of Patent: Mar. 26, 2013

(54) EXPERT SYSTEM AND METHOD

(76) Inventor: Glenn Hofford, Marysville, WA (US)

( * ) Notice: Subject to any disclaimer, the term of this patent is extended or adjusted under 35 U.S.C. 154(b) by 943 days.

(21) Appl. No.: 12/493,160

(22) Filed: Jun. 26, 2009

(65) Prior Publication Data

US 2009/0327811 A1    Dec. 31, 2009

(51) Int. Cl.
*G06N 5/00* (2006.01)
(52) U.S. Cl. .......................................... 706/45
(58) Field of Classification Search ...................... 706/45
See application file for complete search history.

(56) References Cited

PUBLICATIONS

Hampton, The Role of Similarity in Natural Categorization, Chapter in: M.Ramscar, U.Hahn, E.Cambouropolos, & H.Pain (Eds.), Similarity and categorization, Cambridge University Press, 2000, pp. 1-11.*

* cited by examiner

*Primary Examiner* — Wilbert L Starks
*(74) Attorney, Agent, or Firm* — Jellett, Matthew

(57) ABSTRACT

A system and method is provided for representation of a real world problem situation. The system includes a computer software process which can acquire or accept a set of input data. The input data generally includes seed facts and user entered facts. The set of input data represents real world objects which pertain to a real-world problem situation. The computer software process generates new data. The new data consists of additional not-previously-known facts about the real-world problem situation. The additional not-previously known facts include acquired facts and reasoned facts. The computer software process utilizes a fact structured representation method. The fact structured representation method represents a first group of facts about a problem situation. It also represents a rule structured representation method for representing a first group of rules about a class of problem situations. The computer software process also represents a plurality of causal features of the problem situation so that a reasoning process results. The reasoning process is characterized as performing some elements of deep reasoning.

76 Claims, 9 Drawing Sheets

EXPERT SYSTEM AND METHOD

RELATED APPLICATIONS

This application claims priority benefit of U.S. Ser. No. 61/076,070 filed Jun. 26, 2008.

DESCRIPTION OF THE PREFERRED EMBODIMENTS

Generally speaking, a system and method for knowledge engineering which provides for reasoning or inference by utilizing the representation of facts and rules is provided. The system provides for modeling of problem domain facts, for modeling of rules for a problem domain, for driving the process of acquiring additional facts, and for determining deduced facts.

Within the field of expert system technology, this system provides a higher-level of complex reasoning for involved real world problem situations. This system uses deep representation or modeling, as opposed to traditional shallow representation. It uses a representational approach where structure is incorporated into the representation of facts and rules. Deep representation can be useful towards the goal of creating effective and powerfully capable knowledge engineering systems.

Figure 1:
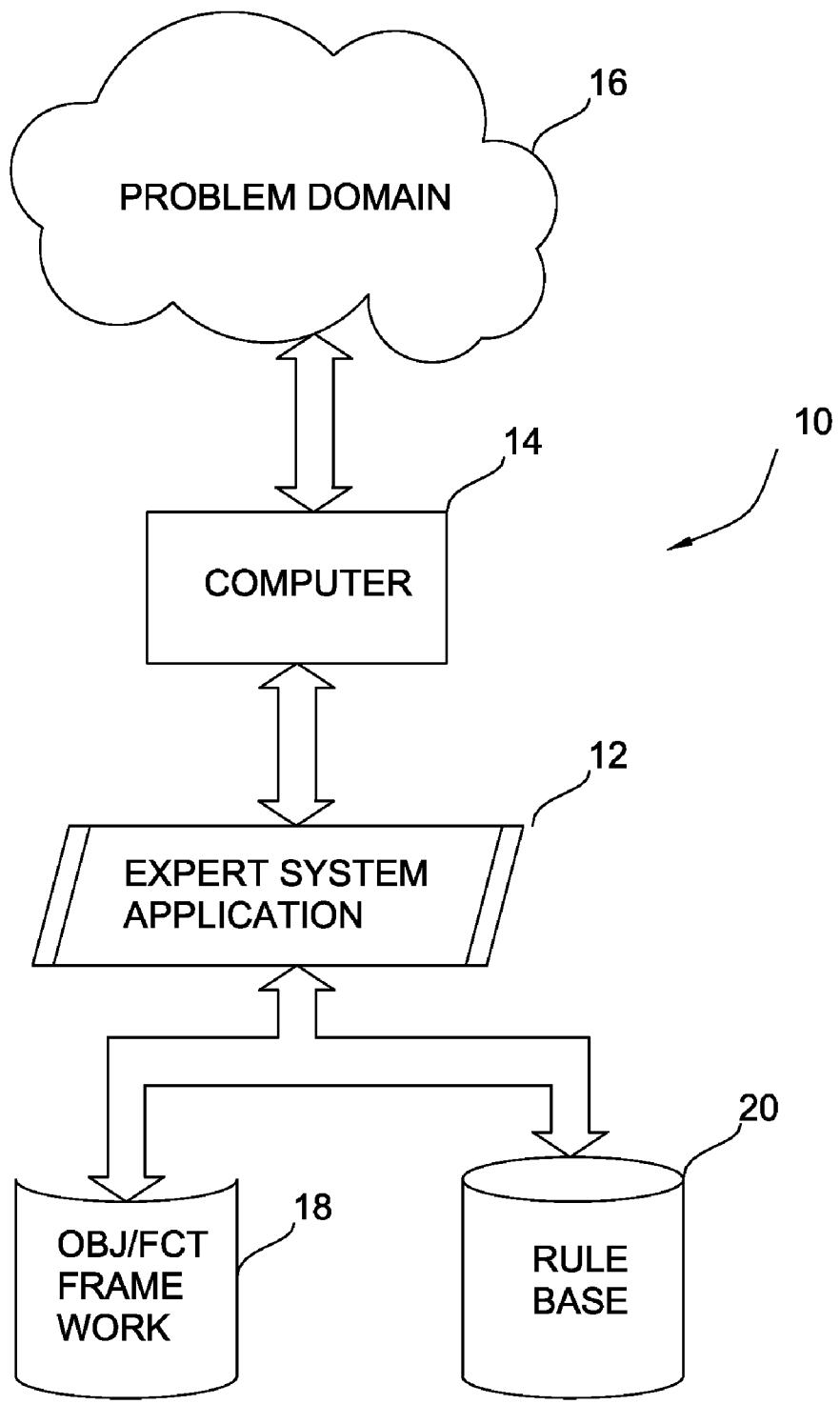
FIG. 1 is a schematic view of the expert reasoning system.

Thus the present concept provides for a representational scheme that allows for sufficiently multifaceted representation of real world physical structures. Referring to FIG. 1, the problem domain 16 may include a system and its environment, which both pre-exist in the real world and which become the subject or target of human or computer cognitive activity.

For example, a computer network problem domain can be the subject of a diagnosis type of reasoning. Other types of problem domains may include crime scenes (as the target of investigation); computer printer problems; computer DNS (Domain Name System) name or IP address lookup problems; automotive diagnosis problems; medical diagnosis problems; legal diagnosis problems; troubleshooting of software applications etc. The previously recited example is not intended to be restrictive but open ended for the inclusion of additional subject problem domains.

The present system 12 requires the introduction of one of two representation techniques for the storing of facts in an object/fact database 18 such as: the use of attribute clusters where a cluster describes one real world object, or the use of a representational dimensional-based framework where each element of the framework is identifiable with respect to its physical location using a set of coordinates such as with a single or multi dimensional array.

Such a system performs a form of reasoning through the use of representational techniques for rule-based deduction utilizing for example a rule database 20, where the use of a special "binder" function may specify a formula or algorithm to use when generating new facts from a deduction routine in which each new fact represents an object about which full attribute information, including both the location attributes of the object and the quality attributes of that object, may be known.

The present concept utilizes a number of components which include: a system for representation of facts of the situation; a system for the representation of the logic or rules of the situation; a system for driving the process of detecting or otherwise acquiring additional facts from the target environment after the initial factual situation (a coordinator of a fact-acquisition control strategy); a system for generating new facts from pre-existing facts (a reasoning or inference or deduction process which uses predefined or well-known rules about the behavior of the target system or target area); and a system for searching the set of facts that have been acquired and/or deduced to identify the trouble areas, faults, or fault groups.

Overall, the present system and method relates to the diagnosis or troubleshooting of a pre-existing problem, where the problem domain as previously discussed may be an executable computer software process which has been run or failed to run and where the executed process as referred to previously is either a subsidiary process, a target system process, or other problem domain process.

Because the expert system 12 as seen in FIG. 1 can be applied to a variety of problem domains 16, a lexicon for the implementation of the expert reasoning system 12 is herein provided for further support of the technical specification.

After the lexicon has been fully described, a general discussion of the concept will be presented, followed by a detailed discussion of an implementation of the overall system upon which a subject problem domain, such as nslookup or ping, as executed in the Microsoft Windows operating system environment may be applied.

Expert System: a computer software program that performs operations on data that can be considered as representing facts about some type of situation (problem domain), in order to generate previously-not-known facts, or knowledge (rules), using some procedure or set of procedures. Such a system can be said to embody a form of "artificial intelligence", in that it performs tasks that resemble some parts of human cognition. As used herein, the term "expert system" describes a system that uses stored rules in order to perform operations on facts in order to generate additional facts.

Cognitive tasks: broad categories of tasks that are best defined by way of example: diagnosis ("troubleshooting")—cognitive activities that attempt to determine the cause of some failure pertaining to an event that has occurred in the past; planning—cognitive activities that attempt to formulate a plan, i.e. a set of actions that will accomplish some future goal; design—cognitive activities that attempt to formulate a description of an artifact (a "system" that is reusable) that will be capable of accomplishing some set of goals; learning—cognitive activities that involve the acquisition of factual knowledge about the past and the acquisition and formulation of behavioral knowledge (which is abstract), i.e. rules about "how things work".

Problem Domain: a class or type of situation comprised of a system and its environment that exists in the "real world" and that becomes the subject or target of human or computer cognitive activity. For instance, the computer network problem domain can be the subject of diagnosis reasoning.

Situation (or, "Problem Situation"): an instance of a problem domain. A particular case: for instance, in the realm of crime investigation, a "situation" is one particular event, e.g. a specific murder. A problem situation can usually be described in terms of a system and the environment of the system. A synonym for "situation" is the term "scenario".

Representation: First, factual representation is that which involves any scheme or system wherein a so-called "real world" set of objects, with attributes for the objects that form facts about the objects is described. The set of objects are usually those objects that exist in some problem domain. Factual representation may be specifically about a problem domain or situation that existed in the past, or one that is described as existing in the future, or one that only exists abstractly. Second, behavioral, or knowledge representation is that which involves any scheme or system wherein rules concerning behavior or causality pertaining to processes of objects is described. Representation thus defined is independent as to media or form and as to whether it pertains to human intelligence or to machine intelligence.

Generic Expert System: one that separates knowledge (usually "rules") about the problem domain from the algorithms that use that knowledge in such a way as to allow variability as to its capability for performing expert-like cognitive tasks, depending on the knowledge that is available to it. For instance a generic troubleshooting expert system could be given a knowledge base that describes rules about computer network TCP/IP behavior so that it can troubleshoot computer network failures; and the same generic expert system could be given a knowledge base that describes rules about computer printers so that it could troubleshoot printer failures.

Symbol-based Expert System: one that uses a form of representation involving symbols, where the symbols represent objects, attribute types, attribute values, etc., and where phrases or expressions can be constructed using symbols to represent attributes, facts, rule nodes, etc. Human-readable symbols are usually chosen, for instance: object name=SphericalObject001; a sample attribute type is "Color"; several sample attribute values include {Red, Green, Blue}.

Rules-based Expert System: one that relies on a set of symbol-based rules in a rule base (the "knowledge base"). The rules may be "if-then" rules, or they may be representational constructs that have some other form, for instance, the following logic phrase can be described as a rule: "for all x, man(x)->mortal (x)". A rule is usually understood as a representational construct that represents some aspect of causality in the physical world; for instance a rule could be created that represents the law of gravity.

Domain Independent Model ("DIM"): for a class of expert systems, an abstract set of representational principles and techniques and guidelines. The DIM includes a high-level set of attribute types (the "attribute super types").

Domain Specific Model ("DSM"): for a particular expert system, the set of attribute type names ("terms") and corresponding attribute value sets. This can be referred to as the "terminology" for the expert system.

Representation in a Rules-based Expert System: such a system must incorporate or interact with two main types of information: rules and facts. Rules are abstract representations of behavioral (causal) knowledge—i.e. "how things work". (in scientific fields they can be described as the "laws of nature"). Facts are representations that pertain to a specific situation, which situation constitutes an instance of the problem domain. For example, in an expert system that troubleshoots automobile engine ignition system failures, an automotive technician may perform a test under observation—an attempt to "start the car" by engaging the ignition key. This particular test (the "situation") will be described using a set of facts, which facts describe its starting state, its ending state, and any known intermediate states.

Shallow Representation Rules-based Expert System: any such system wherein the rules do not contain structural information to allow for the generation of fully-qualified new facts.

Deep Representation Rules-based Expert System: any such system wherein the rules contain either a) "structure information", or b) multi-level behavioral information. Structure information allows for the generation of fully-qualified ("rich") attribute information about objects (this information is thus "multi-faceted"). For a system where the rules contain structure information, the fact base (or, working memory fact representation store) will also contain such structure-related information. For example: in a system where a two-dimensional integer-based coordinate framework is used to represent all objects of the situation, a rule contains structure information so that not only is the quality attribute for an object generated, but the object's location attributes are determined so that the object can be "placed" in the correct location in the framework.

Reasoning Engine: a computer program that starts with existing facts pertaining to a situation, and that performs the task of generating new facts about the situation, which newly-generated facts are generated, not primarily via acquisition or detection, but by using an algorithmic method that relies on a search for and an application of relevant rules from a rule base. This process can be described as that of "reasoning", and it may fit well-known definitions of "deduction" or "inference". The reasoning engine may also incorporate methods or control strategies that allow for the acquisition of facts that are needed in order to perform the reasoning tasks. For instance, fact acquisition may be done via the automated retrieval and execution of stored detection functions. (the term "inference engine" is sometimes used as a synonym for "reasoning engine").

Target System: also referred to as "Subsidiary Process". A set of objects from a problem domain or situation that are causally interconnected to form a system. A target system has the following elements: starting state, ending state, and intermediate states. Examples include: a) an instance wherein an automotive technician performs an "engage ignition test", b) an instance of execution of the network diagnostic program called "nslookup", and c) a "DNS query"

DNS Query—an instance of execution of a query from a client computer to one or more server computers, for instance a query for a DNS name, e.g. www.google.com, wherein a client computer sends a request consisting of the DNS name to a DNS server computer, for which it expects a response from the server that contains an IP address or addresses that correspond to the DNS name.

Target Environment: The environment, consisting of objects, that is relevant for a situation involving a target system. For instance, where the target system is an automobile ignition system, the target environment is all other objects in the environment that may have a causal relationship with the system—e.g. the ignition key, the person who turns the key, the car engine, etc.

Past Occurrence Target System: one that occurs in the past with respect to the reasoning process. Examples include the automotive ignition test and the nslookup execution instance.

Object: a real world entity. (this term is not used to describe the corresponding representational construct that represents such an entity—cf. "object indicator"). An object has at least the following attributes: a) each of four location attributes that represent its place in a four-dimensional coordinate system, whether or not any specific such system is actually used for representation, and b) at least one quality attribute. An object thus defined has no temporal duration and thus it cannot be said to "move". Objects are represented where facts are involved—e.g. in a fact base or fact store (i.e. in a fact framework). (in contrast, rule nodes represent "object classes", rather than specific objects; cf. "Object Class", below).

Object, in a Representational Framework System: either a) a temporally transitory object (that exists only for the duration of one time increment), or b) a set of such objects with fixed location coordinates (a permanent location object). The set of such objects thus defined can itself be termed an "object". Such an object occupies a fixed place within the framework, i.e. the values of its location attributes do not change from time=1 to time=n. Therefore, such an object is not capable of "motion".

Transitory Object: as described above, an object that exists at only one point in time. A distinction is not herein made between an object that would exist for the duration of the smallest distinguishable time unit, versus an object that would exist only instantaneously. Such a distinction is not meaningful since the representational scheme does not involve motion of objects—which implies that during any given duration of time the state of an object is unchanging. (similar to the frames of a film reel—each frame is a snapshot of the state of a situation with its objects that reflects that state at an instant in time).

Permanent Location Object: as described above, the set of all transitory objects at a fixed location in a representational framework during the duration of the target situation. Where the term "object" is used without a preceding adjective, it refers to this type of object.

Permanence of State Assumption: this assumption has reference to permanent location objects in a representational framework; it is that such objects do not change with respect to state unless otherwise represented. For cognitive tasks such as diagnosis of computer failures, this assumption holds true universally for the problem domain, and thus enables a static framework (with multiple spatial dimensions and a single temporal dimension with a single value (e.g. time=1)) to be used.

Object Indicator: a symbol that represents a real-world object. For instance "x". Object indicators are not needed in some representational systems. An object indicator is only used where facts are represented, e.g. in a fact base.

Unit Object Representational Construct ("UORC"): a representational construct that represents one unit-sized real world object. Two types of UORC: 1) a cell in a representational framework; and 2) an attribute cluster. A UORC is essentially a collection of attributes, such that there are several location attributes that fully describe where the object is in the problem situation, and at least one quality attribute.

Representational Framework: a representational framework with one or multiple dimensions wherein each element (cell) may be described either with a set of integer coordinates from a dimension or from multiple such dimensions, or with an enumeration of named locations each of which may be correlated with an integer coordinate (or with multiple such enumerations).

Spatial Dimension in a Representational Framework: an integer-based dimension. For instance, the "x axis" in a Cartesian coordinate system.

Spatial-Derivative Dimension in a Representational Framework: an enumeration of named locations each of which may be correlated with an integer coordinate for a single dimension. Uniqueness: no named location may overlap any other named location. Actual spatial adjacency is not required for numerically-adjacent elements: for example, the SpecificLocation dimension for a computer network troubleshooting system contains two numerically-adjacent elements: ComputerName, and ComputerDomainName. Physically, these two locations are not necessarily spatially adjacent to each other.

Root Unit Size Convention for Spatial-Dimensional Framework or Spatial-Derivative Dimension Framework: the convention that requires each object to be either indivisible with respect to spatial coordinates, or effectively indivisible with respect to spatial-derivative coordinates, and, no object may overlap any other object in the framework.

Temporal Dimension in a Representational Framework: an integer-based dimension that represents time, just as numbers represent points on a timeline.

Framework with Multiple values for the Temporal Dimension: a framework and supporting functions that uses multiple copies of the basic spatial-dimensional framework for the purpose of representing multiple time-sequenced snapshots of the situation. Such a framework is needed for problem domains where the permanence of state assumption does not hold true for at least one object of the situation. Such framework is described herein for completeness, but is not used in the present system.

State: a fact about a transitory object.

Attribute: a descriptive piece of information about an object that consists of an attribute type name and an attribute value.

Attribute Type Name (or, "attribute type"): a class of attribute ("characteristic", "feature") about an object, or, the name of such a class. For example, the words "Color", "Shape", "Distance" are attribute types. Synonym: "term".

Location Attribute Type: an attribute type that represents spatial or temporal dimensions. Examples include "General Location", "LocationWhichComputer", "Specific Location", "LocationWithinComputer", "Time of Day".

Quality Attribute Type: an attribute type that represents some essential, "internal", "quality" feature of an object, not to include causal or behavioral features of the object. Examples include "Color", "Substance", "Shape", "Numeric Value", "String Value".

The Size Attribute Type: any attribute type that describes spatial or temporal or spatial-derivative qualities of an object. Where a representational framework adheres to the root unit size convention, the size attribute is not needed for descriptions of unit-sized objects; however it may be used to describe aggregate objects.

Behavioral Attribute Type: any attribute type that describes aspects of an object that pertain to causality or behavioral potential.

Exclusion of Behavioral Attribute Types Convention: a rule for the modeling of rules and representation of objects for a rule base that prohibits the use of behavioral attribute types. The rationale for such a convention is the need to consistently describe all elements and aspects of causality with respect to the target problem domain solely by means of rules in a rule base.

Attribute Value Set: a set of values that corresponds to an attribute type. For instance, the set "{Red, Green, Blue}" corresponds to the attribute type "Color".

Fact: (as herein described) a fact is a piece of information that pertains to a specific instance (situation). A fact is an attribute about an object; however it is a particular type of attribute wherein it represents a quality attribute for the object. (I.e. a single location attribute is not a fact). For example, the phrase "the United States Congress is in session in the US Capitol building" is a fact that represents a quality attribute about the location—the United States Capitol building. By way of contrast, the location attribute consisting of the street address of the United States Capitol building is not itself considered a fact.

Seed Fact: is a fact provided to the expert system as input. A seed fact is a fact that is known to be true at the outset of the reasoning process.

User Entered Fact: a fact that is either entered by the user thereby providing it to the expert system, or one that is under user control for editing purposes. For example, a user-entered fact may actually be "imported" from a computer command window automatically, after which it is displayed in an on-screen edit window for user editing and verification purposes.

Starting State Fact: with reference to a target system (or its environment) of the problem domain: any fact that represents a state of some object that is relevant for the starting point (with respect to time). Usually such a state is causally determinative for subsequent behaviors occurring as the target system effects a process. For example, in the automotive testing scenario, a starting state fact would be a representation of the fact that the technician had exerted pressure on the car brake in order to engage the brake during the time in which the ignition was engaged.

Starting State Action: with reference to a target system (or its environment) of the problem domain: any action that takes place at the starting point, except that starting state actions are not used since the use of the starting state fact representational construct is sufficient for the purpose of representing the relevant detail.

Ending State Fact: with reference to a target system (or its environment) of the problem domain: any fact that represents a state of some object that is relevant for the ending point (with respect to time). Usually such a state is causally dependent on the prior behaviors that occurred as the target system effected a process.

{The Following Three Terms Apply Only to the Forward Reasoning Process}

Known Antecedent Fact: in the context of automated reasoning, a fact that is provided as input for a forward reasoning function. (an example from the nslookup problem domain is the execution of the nslookup command using a command string of "nslookup www.google.com").

New Antecedent Fact: in the context of automated reasoning, a fact that is acquired under direction of control strategy logic that is part of a forward reasoning function. (an example from the nslookup problem domain is the fact that represents the primary DNS server address that is stored on a client computer).

New Consequent Fact: in the context of automated reasoning, a fact that is generated by reasoning by a forward reasoning function; this can occur only if all antecedent facts are determined to be true. (an example from the nslookup problem domain is the fact that represents that a DNS query message was sent from a client computer to a DNS server computer, regardless of how the DNS server computer subsequently responded).

{The Following Three Terms Apply Only to the Backward Reasoning Process}

Known Consequent Fact: in the context of automated reasoning, a fact that is provided as input to a backward reasoning function. (an example from the nslookup problem domain is the DNS response message, displayed on-screen by nslookup "Request to Unknown timed-out").

Limiting Initial Condition Fact: a premise fact that represents an antecedent state but that is used within a backward rule consequent part to allow for further distinguishing a rule from similar rules.

New Antecedent Fact: in the context of automated reasoning, a fact that is generated by reasoning or by fact acquisition as a derived fact by a backward reasoning function; this can occur only if all consequent facts and all limiting initial condition facts are determined to be true. (an example from the nslookup problem domain is the fact that represents a state on a client computer wherein the stored primary DNS server address was an invalid address; i.e. not an IP address of a reachable computer or not an IP address of a computer that is a DNS server).

Derived Fact: any fact that is determined either by fact acquisition or by reasoning during the course of automated reasoning.

Acquired Fact: a fact that is acquired during processing, e.g. a detected fact, or e.g. a fact that is prompted for and entered in response by a human user.

Detected Fact: a fact that is acquired by a detection routine.

Reasoned Fact: a fact that is generated by application of a rule and that corresponds to either a rule consequent node (for a forward rule) or a rule antecedent node (for a backward rule).

Metadata Property: an attribute of an attribute; the system restricts the metadata property to apply only to facts.

Metadata Property: FactRepresentationStatus: a property that represents an aspect about a fact, for instance that it was not determined because the fact acquisition process failed, or that it was determined and as expected, or that it was determined and not as expected. The values are: {NotDetermined, AcquisitionAttemptFailed, AcquisitionAttemptProducedUnexpectedCoordinates, AcquisitionDeductionMismatch, DeterminedAndAsExpected, DeterminedAndUnexpected}

Metadata Property: FactHowDetermined: a property that represents an aspect about a fact, for instance that it was entered by the user. The values are: {EnteredByUser, DetectedOrAcquired, Deduced}

Metadata Property: FactIsAFault: a property that represents an aspect about a fact, for instance, that in the context of diagnosis the fact is a fault. The values are: {true, false}

Determined Fact: a fact the truth value of which has been determined. The metadata property "FactRepresentationStatus" is equal to one of: DeterminedAndAsExpected or DeterminedAnUnexpected.

Fact Store: a temporary computer memory structure that stores attributes about objects from a problem domain. It is usually implemented as an array of structures or as a list of structures. It is temporary and is used during the processing/execution of the reasoning engine. A fact store can use any of a variety of implementation methods, for instance, a "object/fact representational framework", or an attribute cluster approach Fact Base: a permanent data base that stores copies of fact stores for execution instances of the expert system.

Object/Fact Representational Framework: an implementation of a fact store wherein a coordinate system ("matrix") (e.g. a computer array) is used for the representation of location attributes.

Attribute Cluster Representation Scheme: an implementation of a fact store wherein each object is represented using a cluster of attributes. Such a system may need to enforce conventions such as the requirement that every object have an object identifier, at least n location attributes, where n is chosen beforehand, and at least one quality attribute.

Rule Base: any computer memory store, usually permanent, that is capable of storing rules. The organizational method for the rules may be as straightforward as that of a simple list of rules. The rule base rules must be searchable and retrievable.

Rule: a piece of information that is abstract, i.e. it can correspond to any of a number of specific instances. A rule represents some aspect or aspects of causality about a class of real-world phenomena. The system utilizes a rule having both a premise part and a conclusion part, and both an antecedent part and a consequent part. A rule can be a state rule or an action rule. (This system does not use action rules).

State Rule: a state rule has an antecedent part and a consequent part; the antecedent part describes states of objects that have a causal effect upon the states of objects that are described in a consequent part. A state rule describes one or more "unavoidable implications" (conclusions). The direction of implication is either: A) forward OR B) rearward.

Forward Rule: a rule with the following properties: the object class states that are represented by the antecedent rule part must have a causes relationship to every object class state that is represented by the consequent rule part.

Backward Rule: a rule with the following properties: the object class states that are represented by the consequent rule part must have a caused-by relationship from every object class state that is represented by the antecedent rule part; except where the antecedent rule part contains a top-level disjunction of nodes or node groups; in such a case the object class states that are represented by the consequent rule part must have a caused-by relationship from at least one object class state or group of object class states that are represented within the antecedent rule part, within the top-level disjunction.

Limiting Initial Condition: a node or group of nodes that represent states of classes of objects that are within the temporal scope of the antecedent; e.g. for a backward rule, a limiting initial condition describes a state that existed at the same general point in time as the states of object represented by antecedent nodes.

Temporal Scope: {for a rule part} a time period that starts at the point in time at which the earliest state within a rule part (antecedent or consequent) is represented and that extends to the point in time at which the latest state within the same rule part is represented.

Rule Antecedent Part: a rule node or collection of nodes each of which represents a fact class; each node represents a fact class that has a time-prior relationship to the nodes of the rule consequent as well as a causal relationship to the nodes of the consequent. A rule antecedent part can be analogous to a computer programming conditional "if" expression. On a timeline, antecedent-X must precede consequent-Y.

Rule Consequent Part: a rule node or collection of nodes each of which represents a fact class; each node represents a fact class that has a time-subsequent relationship to the nodes of the rule antecedent as well as a causal relationship with the nodes of the antecedent. (i.e. rule antecedent nodes represent facts that cause the states represented by rule consequent nodes). A rule consequent part can be analogous to a computer programming conditional "then" expression.

Rule Premise: the part of the rule corresponding to facts that are provided as input and corresponding to facts that may be acquired during fact acquisition; this is the rule antecedent (for forward rules); this is the rule consequent (for backward rules that are used by backward reasoning). A premise fact is a fact that is known to be true, prior to the operation of applying the rule to produce other information (or any fact that is determined to be true by fact-acquisition, and part of the same rule-part, during the operation of applying the rule).

Rule Conclusion: the part of the rule that is applied during a reasoning process to generate a new fact; this is the rule consequent (for forward rules that are used by forward reasoning); this is the rule antecedent (for backward rules that are used by backward reasoning); this is the rule antecedent (for rearward rules that are used by the perform test driver reasoning algorithm).

Example rule where the conclusion part correlates with an antecedent rule part:
Rule name: "DNS query with valid (existent) domain name returns success".
Consequent={DNSQuery result code=SUCCESS}
Antecedent[0]={DNSQuery with valid (existent) domain name, e.g. "somedomain.com"}
Antecedent[1]={parameters}
Antecedent[2]={domain exists, i.e. "somedomain.com"}<<——CONCLUSION FACT will be derived from this antecedent Rule Binder: a function that logically connects the antecedent and consequent rule parts. Binder functions are the main way in which the rule base has "deep representation". A binder function allows for the generation of location attributes for the newly-deduced facts when deduction occurs.

Rule Lateral Binder: (Rule Relator Calculator) a binder function that allows for the generation of location attributes for nodes within the same rule part (antecedent or consequent). For instance, a lateral binder allows for the generation of location attributes for all other antecedent node-based facts within an antecedent, from the known antecedent node-based fact.

Rule Node: a component within either rule part (antecedent or consequent) or within the rule context that when applied by a reasoning algorithm or context processing algorithm results in the generation of a new fact. A rule node is an UORC. It represents one and only one external real-world object class, with a specified state, i.e. it has at least one quality attribute with a specified value. It directly corresponds to and resembles a single fact. When used by a reasoning engine that also incorporates a control routine for driving fact acquisition, a rule node may correspond to any of the following types of fact: a) user-entered fact or seed fact, b) an acquired (e.g. detected) fact, or c) a deduced fact.

Object Class: ("Real-World Object Class") the class of object that is modeled by a rule node.

Rule Context Node: a special type of rule node that is included as part of a rule because it supplies a term that is needed by one of the nodes within the antecedent or the consequent.

Rule Node Negation Indicator: a symbol, e.g. the word "NOT", that indicates the negation of the fact that is represented by the rule node.

Rule Node Disjunction: a group or collection of rule nodes, separated by "OR".

Rule Node Conjunction: a group or collection of rule nodes, separated by "AND".

Fact Acquisition Method: any method, routine or procedure that attempts the task of determining a fact that is needed for the processing of a rule. Such method may be an approach wherein a computer user-interface mechanism is used to prompt a human user to enter a value for the needed fact; such method may be an automated routine that attempts to perform detection. Any such method must be able to report a value for a specified attribute, and if it fails to determine the needed attribute value it must be able to report such with an error code.

Fact Acquisition Method Library: this contains fact acquisition methods that may be referred to by name. This allows a rule base rule to contain a reference (e.g. a name or a pointer) to a fact acquisition method, in order that, during processing by the reasoning routines, such a routine may be invoked automatically.

Detection Function: a particular type of fact acquisition method that allows for automated detection of an attribute value to take place.

Control Flow Coordinator: a routine that invokes the routines that perform the various fact acquisition and reasoning tasks, for instance a control flow coordinator may invoke an atom processing routine, then a forward reasoning routine, and finally a backward reasoning routine.

Rule Atom: a special type of rule that exists for the purpose of identifying a fact acquisition method; this rule only contains context nodes; it does not contain antecedent and consequent nodes.

Rule Molecule: (similar to rule atom, but instead of referring to a detection routine, it refers to a "PerformTest" routine).

Context Processing Routine: a routine (function) that processes all context nodes for a rule. This mainly involves calling the detection routines for each context node, and storing the newly-acquired facts into the fact store.

Atom Processing Routine: a routine (function) that processes rule atoms.

Molecule Processing Routine: a routine (function) that processes rule molecules.

Reasoning Algorithm/Routine: a routine that performs not only fact acquisition (as necessary), but that also performs deduction in order to derive new facts. Deduction is performed on the basis that the rule base rules embody representations of causal behavior in the real world.

Reasoning about Past Occurrences: this involves a process of fact acquisition and deduction that starts with the following two input data elements: a) starting state information, b) ending state information. Forward-directed reasoning may be used with the starting state information as input. Backward-directed reasoning may be used with the ending state information as input.

Reasoning to do Troubleshooting (Diagnosis): this involves reasoning about past occurrences, where a special routine is added, the purpose of which is to identify particular facts that are faults in the context of the situation.

Forward-Directed Reasoning Algorithm: High-Level Summary (see FIG. 4 for detail)
  a. Input is: a starting state fact or fact set
  b. Perform search of rule base subset "Forward Rules"
  c. Match of starting state fact or fact set with a node or nodes from a forward rule's antecedent rule part
  d. Retrieval of rule information
  e. Processing of the context nodes from the matching rule
  f. Application of known antecedent rule node
  g. Collection of replaceable terms from the fact corresponding to the known antecedent rule node for insertion into the replaceables list
  h. Retrieval of other antecedent part rule nodes, for each, perform the following:
    i). Execution of stored detection function
    ii). Setting of fact representation status fields
    iii). Parsing of object string if object string exists for the new antecedent fact and collection of replaceable terms for insertion into the replaceables list
    iv). Insertion of this fact as the next antecedent web node
    v). Insertion of this fact into the framework
  m. Determination of whether or not all antecedent facts were determined "as expected"; if so, the consequent rule part can be applied to successfully deduce the conclusion, which is a fact or fact set that corresponds to the consequent rule part
  n. For each consequent rule node: substitution of terms from replaceables list/generation of consequent object string; execution of stored BinderCalculator function; setting of fact "how determined" and fact representation status ("deduced" and "expected"); insertion of this fact as the first (and each subsequent) consequent web node; marking of the new consequent fact as a fault if the fNegativeRule flag is set; insertion of this new consequent fact into the framework
  o. Repetition of search for a rule until at least one rule has been successfully applied Backward-Directed Reasoning Algorithm: High-Level Summary (see FIG. 7 for detail)
  a. Input is: a known consequent fact; when it is first called the known consequent fact is a seed fact that is the ending state fact
  b. Insert a new web node containing the known consequent fact into the fact web
  c. Search of rule base subset "Backward Rules"
  d. Match the known consequent fact with a node from a backward rule's consequent part
  e. Retrieval of rule information—consequent part nodes, antecedent part nodes, and context nodes
  f. Processing of context (a collection of context nodes) to collect replaceable terms for insertion into the replaceables list
  g. Collection of replaceable terms from the object string (if it exists) of the known consequent fact for insertion into the replaceables list
  h. Insertion of a new downward web node into the fact web. This new downard web will contain all new antecedent facts that can be determined using the current rule.
  i. For each rule antecedent node:
    i. Execute the stored binder function to generate location-related attributes for the new antecedent-node-based hypothesis fact, from the known consequent fact
    ii. If a stored fact-acquisition function exists, call it in order to get a quality attribute for the new antecedent hypothesis fact
      a) If the fact-acquisition function succeeds: set the quality attribute for the new antecedent hypothesis fact
      b) If the fact-acquisition function succeeds: set metadata values: FactRepresentationStatus ("determined"), FactHowDetermined ("Detected") for the new antecedent hypothesis fact
    iii. Look up replaceable terms and retrieve actual values in order to build the object string for the new antecedent hypothesis fact
    iv. If the antecedent node is not in a disjunction and no detection function was supplied, deduce the new antecedent fact (it is no longer a hypothesis fact—set metadata values: FactRepresentationStatus ("determined"), FactHowDetermined ("Deduced")
    v. If the fact has not already been determined by detection or deduction, then call the PerformTestDriver vi. If the fact has been determined (either by detection, by deduction or by the PerformTest function), then use the FactRepresentationStatus metadata value to set the FactIsAFault metadata value; e.g. for a negative rule where FactRepresentationStatus is DeterminedAndAsExpected, FactIsAFault gets set to true.

vii. If the fact was determined, insert the new antecedent fact into the object/fact framework and into the fact web at the new downward level (each fact gets added at the new downward level as a new list node at the end of the horizontal list)

j. The new downward level within the fact web now contains a horizontal list of nodes: Starting with the first web node fact from the new downward web, use the new antecedent fact as a known consequent fact, providing it as input to a recursive call to the backward reasoning routine. Recursion ends when a rule base rule cannot be found to process a known consequent fact.

k. Use iteration to process each subsequent antecedent fact at the new downward level (and recurse downwards for each fact). Iteration ends when all antecedent facts from the downward web level have been processed.

l. For each known consequent fact, iteratively perform the above steps to find all matching rules, and apply each rule as described above.

An approach that incorporates structure into the representation of facts and rules is useful for the goal of creating effective and powerful expert systems. Facts are not represented atomically, meaning independently or separate from all other attributes of an object; for example an object that is an object of the fact base, or an object class that is part of a rule in the rule base. The present system provides for a representational scheme which allows for sufficiently multifaceted representation of the real world physical structure. The system requires introduction of either of two representational techniques for fact storing: as previously discussed a) the use of attribute clusters (where cluster describes one real-world object) or b) the use of a representational dimension based framework, (further described herein) where each element of the framework is identifiable with respect to physical location using a set of coordinates. The system uses a representational technique for the rule-base: that being the use of a special "binder" set of functions that specify a procedure to be used when generating new facts from the reasoning routine so that the new fact represents an object about which full attribute information, meaning both location attributes and quality attributes, is known.

In dealing with artificial intelligence, this system utilizes a set of assumptions about how to represent the real world. The representational approach presupposes the following: that there is only one type of unit sized object in the real world, the object having these particular characteristics: the object exists at only one point in space (at the smallest grain size of the representation); however it has "extent"; the object exists for only one duration of time (at the smallest grain size of the representation); the object does not move; the object has any number of "value" attribute types (also referred to as quality attribute types). Also all other objects are "aggregate objects" that can be built using unit sized objects.

In discussing the attribute types of the objects, there are two main "super types" of attributes at the top of the tier and they include: a location attribute supertype, for example, location attribute types within this category are "spatial distance" or "x-coordinate". In addition to location attribute supertypes, there are quality attribute supertypes, for example a quality attribute type within this category may be "color".

Figure 2:
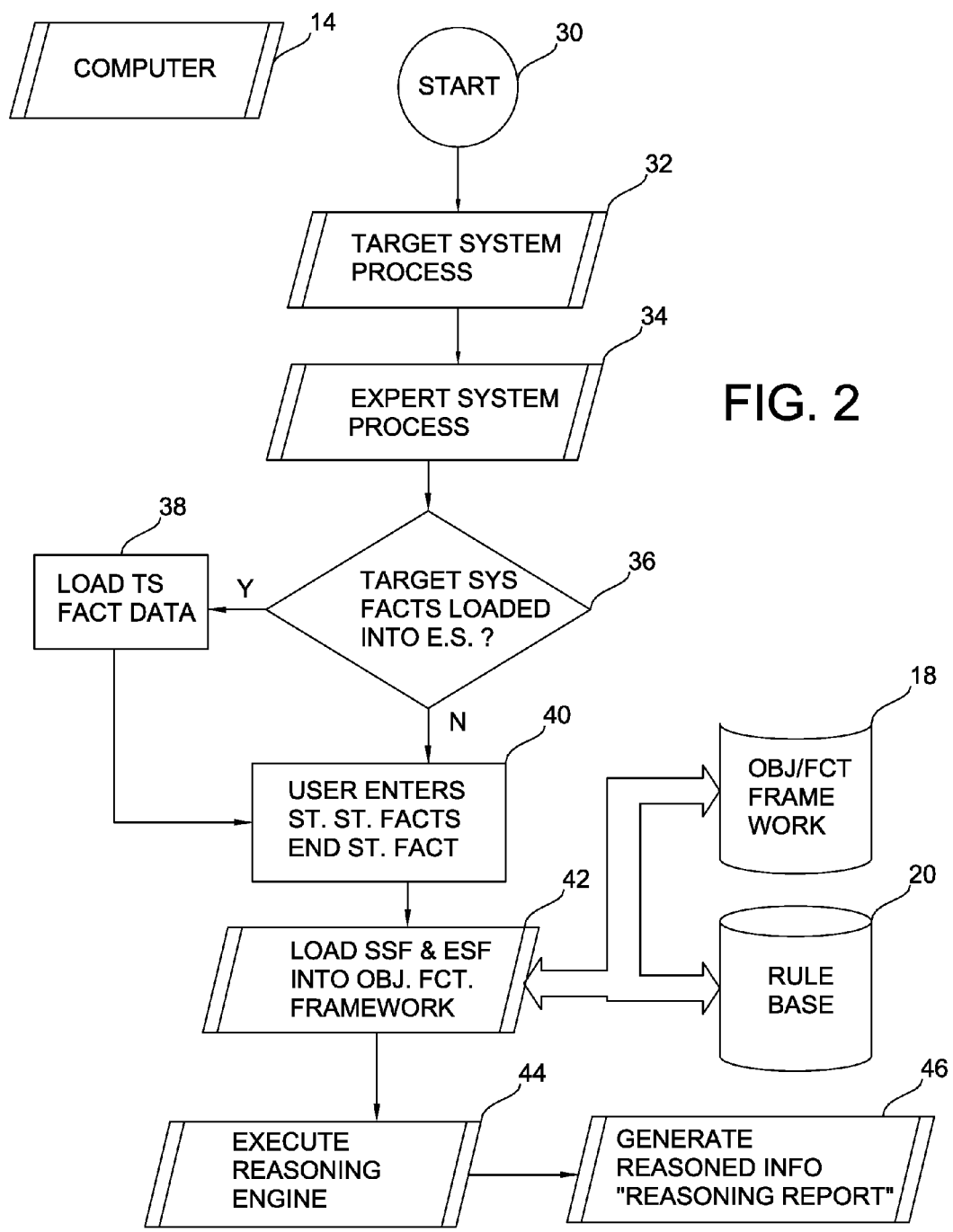
FIG. 2 is a schematic dataflow chart of the expert reasoning method and application architecture.

Generally speaking, the expert system application 12 as seen in FIG. 1, performs a set of tasks which would otherwise require the aid of a human expert; a representational system is used that involves symbols, conventions and rules for storage, retrieval and manipulation of symbols. The system separates declarative information (knowledge/rules) from procedural methods (algorithms). A reasoning engine 44 as seen in FIG. 2, will coordinate information obtained from an object/fact framework 18, a rule base 20, and process this information utilizing a forward and backward reasoning routine to populate additional acquired, deduced, and determined facts into the object fact framework 18 for generation of the reasoned information (the reasoning report) 46. The rule base 20 is a list of rules about the problem domain. The rule-base is encoded utilizing C++ source code, or an XML file, or it may be stored in a database. When the expert system application is launched, the rule base may be loaded into computer memory for fast retrieval. As discussed above, a fact is a value or a phrase that is equivalent to an attribute; however the attribute is referred to as a fact when the attribute exists in a context such as in an object/fact framework 18, or an attribute cluster, such that the object to which this fact applies is fully described with respect to its location attributes and at least one quality attribute. For example, "color=blue" is a fact about an object at attribute location X=5, Y=5, in an object/fact framework; and "X=5" is an attribute about this same object; but the individual attribute without its pairing with the other attributes to define the object instance will not make it a fact in the present system.

As discussed above, an object fact framework is a representational construct (sometimes represented by a computer memory array) that allows objects to be represented in such a way that each object's location attributes are fully represented by the dimensional coordinates of the framework (for example X=5, Y=5) and each object is represented with respect to at least one quality attribute (for example "color is blue"). The object/fact framework 18 is one representational method for accomplishing the requirement that a representation be "multifaceted".

Also as discussed above, an attribute cluster is a collection of attributes all of which pertain to one real-world object. A well formed attribute cluster must have a full set of location attributes, so that its physical location in the real world is unambiguous, and it must have at least one quality attribute. (this may be referred to as "a two-part attribute cluster"). The use of attribute clusters in a representation is another method for accomplishing the requirement that a representation be "multifaceted".

While the object/fact framework is a way of providing for organization of the information in a representational construct, the information itself may be stored in a fact store. A fact store or fact base may be any storage structure, such as that which supports an object/fact framework, or a collection of attribute clusters, which stores facts about a particular problem situation. A fact store is temporary and is not normally saved after the expert system 12 finishes execution to solve a problem. In such a case, the system will produce a results file or report as a list of all facts that were involved in a particular execution instance. A permanent fact base is one that is permanently stored (for example in a database) and it may contain copies of the facts of multiple problem situations each of which correlated with a different instance of the execution of the expert system.

After the reasoning engine has performed its tasks, the present system generally will produce an output report which includes a description of all facts from the situation, including the input seed facts, all detected or aquired facts, and all facts that have been deduced. This output report is derived from the data in the object/fact framework. The expert system will also generate a report which is an analysis of its own execution, which in one embodiment is a text file. This is called the "metadata analysis report".

The expert system may or may not save a permanent copy of the facts of this particular instance. If saved, the facts will be stored in a permanent database storage referred to as a fact base.

A detailed description of one embodiment of the expert system will now be provided. The detailed description will utilize an expert system which is configured to analyze a Windows operating system executable program called "nslookup". What follows are the basic elements of the overall expert reasoning system 10. Referring to FIG. 1, the expert system application 12 is supported by an object fact framework 18 which may be stored in active memory or stored in a database. The expert system application 12 is also supported by a rule base 20 which may also be stored in active memory or in a database. The application 12 is executed on a computer 14 which interacts with the problem domain 16. A discussion of the execution of the expert system application on the computer 14 as seen in FIG. 2 will now be provided.

Generally speaking, the user will initialize the computer 14 and start at step 30. At step 32, the user executes the target system process where the process may be the execution of "nslookup". Once nslookup has finished execution, an instance of the target system has been created. This includes starting state facts such as the application name "nslookup" as well as the application instance parameters, for example "computer01.somedomain.com". It also includes ending state facts such as: incidental output data, for example targeted server name and server IP address, as well as error messages within the output data, for example "request to unknown timed out". The starting state facts along with the ending state facts are the seed facts for the expert system.

The user then executes the expert system process at step 34. The user can execute this application through many different interfaces, such as a graphic user interface or through a command prompt.

Within the expert system process 34, the system then queries whether or not the target system seed facts (the starting state facts and ending state facts) have been loaded into the expert system step 36. This may be a check to determine if the facts from the execution of the target system exist in a command window, or whether or not they exist within memory. If they do exist, then the expert system loads at step 38, the target system fact data is read from the memory or the command window.

If an instance of the target system does not exist within a command window or the memory, then at step 40 the user enters the starting state facts and the ending state facts by hand to begin the expert system process. This step may also involve an optional review step where the user reviews the starting state facts and ending state facts that have been acquired.

With the "seed facts" or in other words the starting state facts and ending state facts entered, the state information can be encoded into the object/fact framework 18. This allows the seed facts to be encoded into the dimensional coordinates of the framework for building of particular objects within the problem situation. After the seed facts are entered into the object fact framework at step 42, the expert system executes the reasoning engine at step 44 to generate the reasoning report at step 46.

Figure 3:
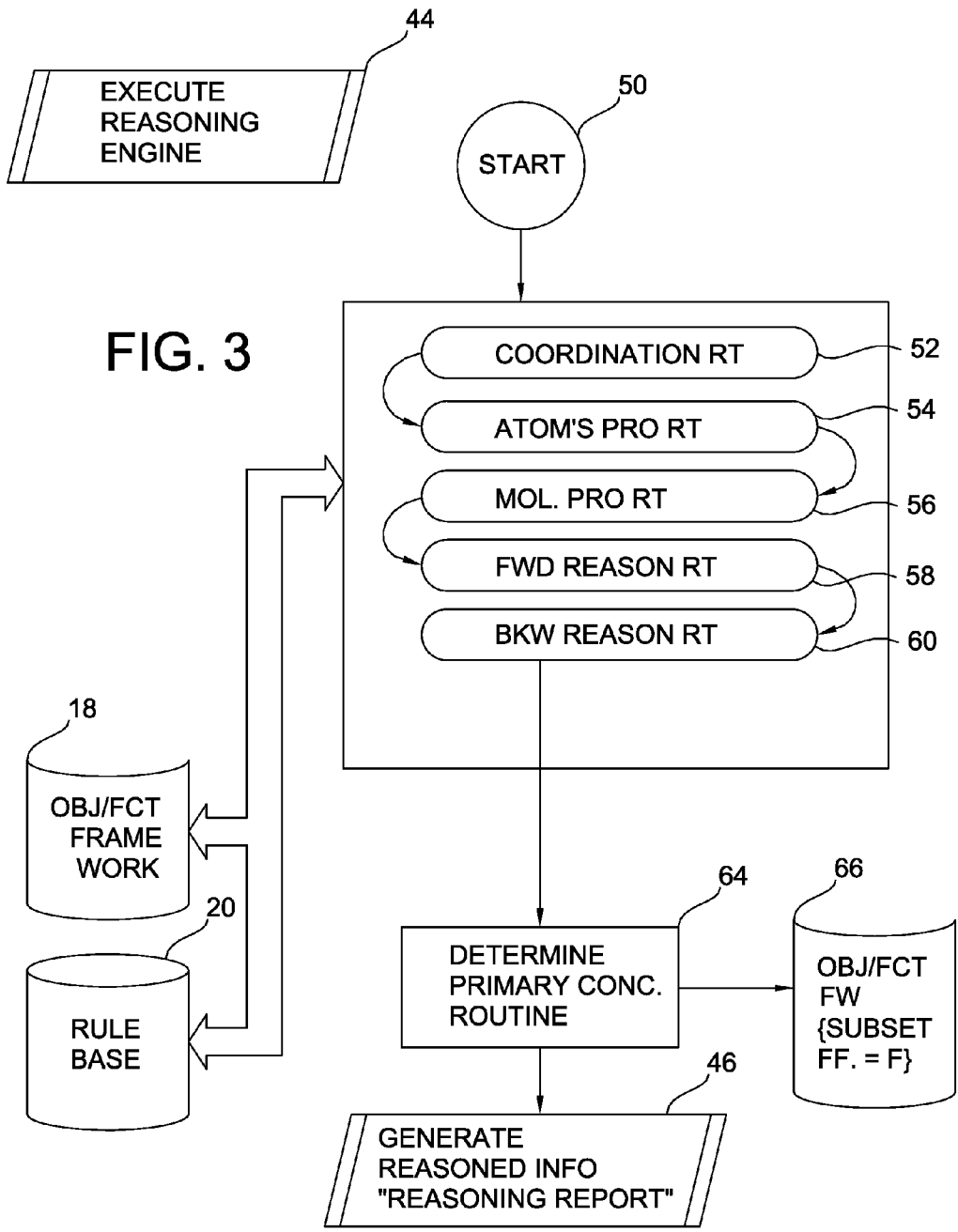
FIG. 3 is a schematic dataflow view of the reasoning engine.

In executing the reasoning engine at step 44, a number of sub processes or subroutines occur to provide for the generation of the reasoning report 46. A detailed discussion of the execution of the reasoning engine 44 will now be provided as seen in FIG. 3. Starting at step 50, the reasoning engine 44 first executes a coordination routine 52. The coordination routine is an procedure which calls the. forward-directed reasoning routine, the backward-directed reasoning routine, the atom processing routine, and the molecule processing routine, for derivation of new facts for the problem situation.

After coordinating the atoms routine 54 and the molecule routine 56 (both of which are fact acquisition routines) the coordination routine 52 calls the forward reasoning routine 58. After the forward reasoning routine is called, the backward reasoning routine 60 is called. During the forward and backward reasoning routines, the fact acquisition process (e.g. detection) and the deduction process are performed, allowing additional (new) facts to be entered into the object/fact framework. The deduction process utilizes the rules from the rule base 20. With the reasoning and fact acquisition complete, the reasoning engine then executes a determine primary conclusion routine 64 which identifies fault information within the object/fact framework. The reasoning engine determines this fault information by searching for fault facts which have been marked as faults within the object/fact framework.

With the determine primary conclusion routine executed, the expert system generates reasoning report information at step 46 which includes showing fault information on the screen along with the framework list, as well as a printable results file (showing a summary of the input used), object/fact framework listing, faults list, as well as an optional metadata analysis report.

Figure 4:
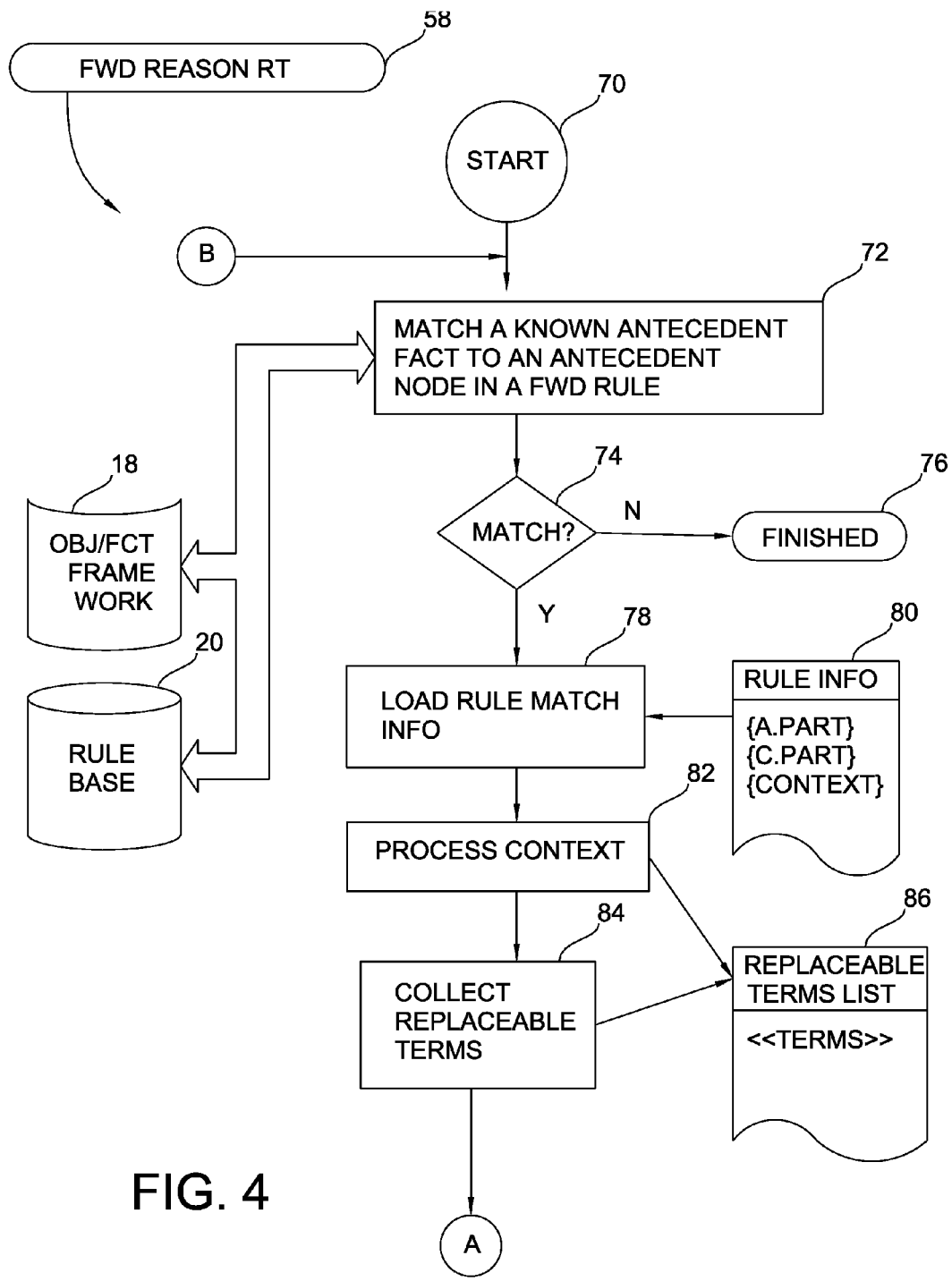
FIG. 4 is a schematic dataflow view of the forward reasoning routine

Referring to FIG. 4, a detailed discussion of the forward reasoning routine 58 will now be provided. The forward reasoning routine starts with a single input fact, usually representing a starting state of the subsidiary target system process, called the "known antecedent fact", then it searches for a matching forward rule in the rule database 20 (where the input fact must match a "known antecedent" node (see lexicon above) within the rule), and then applies the rule to do both the following: a) acquire additional facts that are needed to match other antecedent nodes, often by detection, and b) reason to derive a new fact or fact group which corresponds to the consequent rule part.

The reasoning routine starts at step 70 and checks to match the known antecedent fact to a node within the antecedent part of a forward rule held within the rule-base 20. In other words, a search of a subset of the rule base consisting of all "forward rules" is performed to determine if a rule can match the starting state fact with one of the antecedent nodes. If an antecedent node within a forward rule that matches the known antecedent fact is found, then a match occurs at step 74, and processing continues to step 78, where the rule information is retrieved. If a match is not found during the search process, the search process ends, and processing within the forward reasoning routine is finished at step 76.

A brief contextual discussion of antecedent and consequent parts will be discussed prior to finishing the description of FIG. 4.

As discussed above, a node in a rule corresponds to a single fact when the rule is applied. The antecedent part of the rule consists of one or more nodes. Each node corresponds to a particular fact when the rule is applied. Nodes of the antecedent represent classes of facts that exist at an earlier or prior time in relationship to nodes of the consequent. These facts have a causal relationship with nodes of the consequent. The location-related attributes of the causal relationship may be expressed through use of the binder function to be discussed below.

Along a similar vein, the consequent parts of the rule consist of one or more nodes. Each node corresponds to a fact when the rule is applied. Nodes of the consequent represent classes of facts that are "time subsequent" to nodes of the antecedent. These facts have a causal relationship with the nodes of the antecedent. The location-related attributes of the causal relationship may be determined by a binder function.

Thus to provide a clear distinction between the antecedent and consequent parts, a brief example will be provided. This example will also clarify the meaning of the terms "premise" and "conclusion". A premise is a fact that is known at the outset of the reasoning process, and a conclusion is a fact that is determined by means of a reasoning process. For example, two rules can be created to describe a hypothetical automobile accident scene: rule number one (the forward rule): if (car is traveling greater than 60 mph) (the antecedent), then (the collision will dislodge the engine from the engine compartment in the car) (the consequent). Here the premise corresponds to the antecedent, and the conclusion corresponds to the consequent.

The second rule is used where the consequent fact is the premise, and is used during the reasoning process to derive a conclusion corresponding to an antecedent fact. This rule is: (backward rule): consequent (engine was dislodged from engine compartment), antecedent (car must have been traveling greater than 60 mph). The premise (engine was dislodged from engine compartment) is the consequent, and it can be used to reason backwards to draw a conclusion which corresponds with the antecedent (conclusion: car was traveling greater then 60 mph). In all rules, the antecedent part represents a real world process or processes that are time-prior to the real world process or processes represented by the consequent part.

Figure 5:
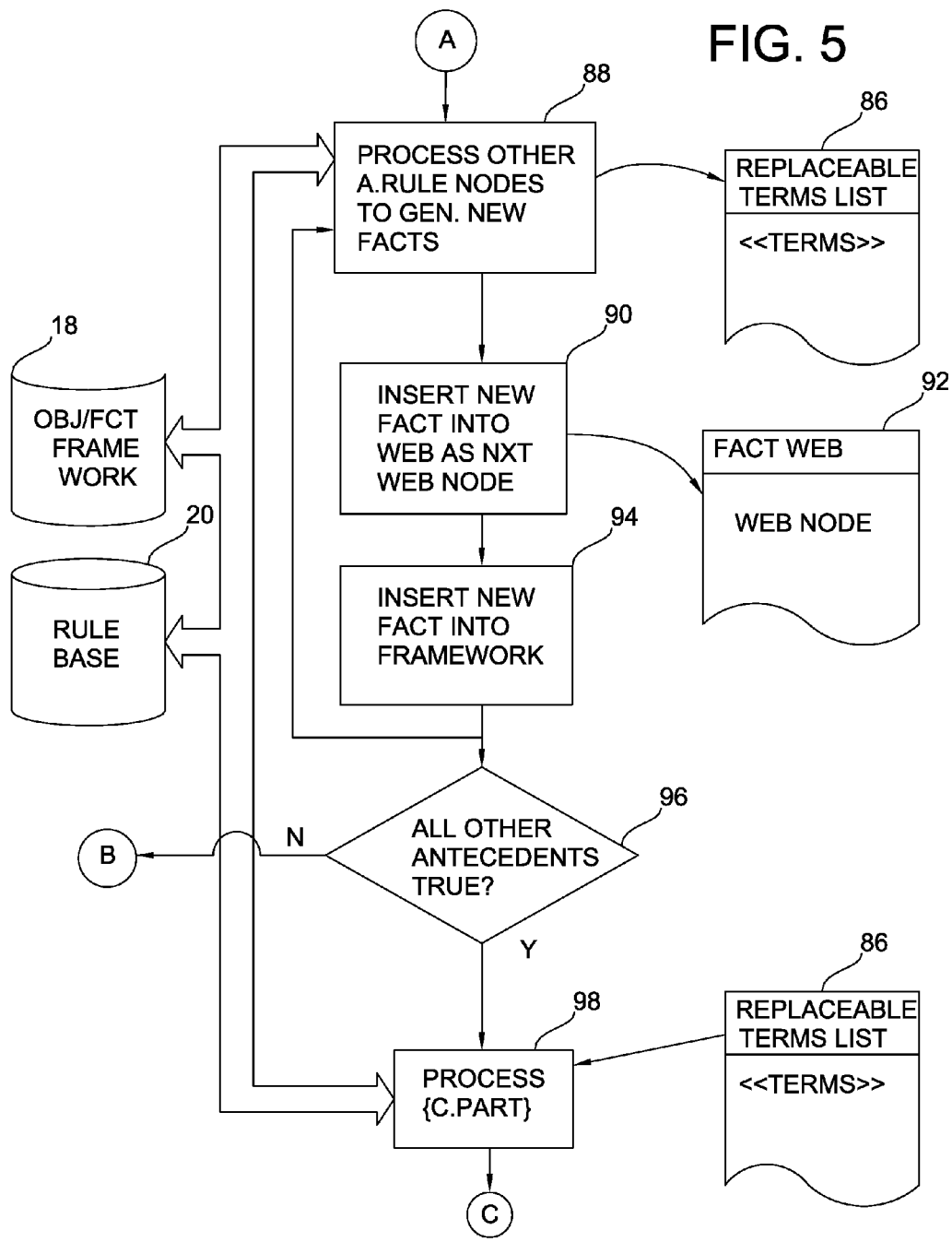
FIG. 5 is a continued schematic dataflow view of the forward reasoning routine.

Continuing the description at FIG. 4, if a match is found at step 74, then the rule information is loaded based on the match. All rule information 80 is retrieved and loaded which includes antecedent part, consequent part, and the context. The context includes other rule nodes that correspond to facts about the local client computer in this particular situation. At step 82, the context is processed, new facts are written into the object/fact framework 18, and new terms are written into the the replaceable terms list 86. At step 84 replaceable terms are collected based on the known antecedent fact, for example the term "hostname" is collected from the object string "nslookup <<hostname>>". Once the replaceable terms are placed into the replaceable terms list 86, and referring to FIG. 5, the process attempts to generate new facts utilizing the other rule nodes of the rule antecedent part, at step 88. In doing so, a stored detection function may be executed, and a set of metadata facet field values (for example fact representation status) may be processed, followed by optional parsing of an object string to collect the replaceable terms. Once again, the new facts are loaded into object fact framework component 18, replaceable terms are inserted into the replaceable list 86, and then at step 90, the forward reasoning routine inserts the new facts into the fact web component 92 to trace the deduction of the facts based on the node development.

A brief description of the fact web 92 will now be provided. The fact web 92 is a tree which maintains facts for guiding the forward and backward reasoning routine process. Once a new fact is entered into the fact Web 92, the new fact is inserted into the framework at step 94. The processing of the other antecedent rule nodes to generate new facts continues to loop until all antecedent rule nodes have been processed.

The forward reasoning routine 58 then checks to determine if all other antecedents are true at step 96. With all antecedent nodes matched to the corresponding facts for the particular instance, the forward reasoning routine 58 processes the consequent part 98.

Figure 6:
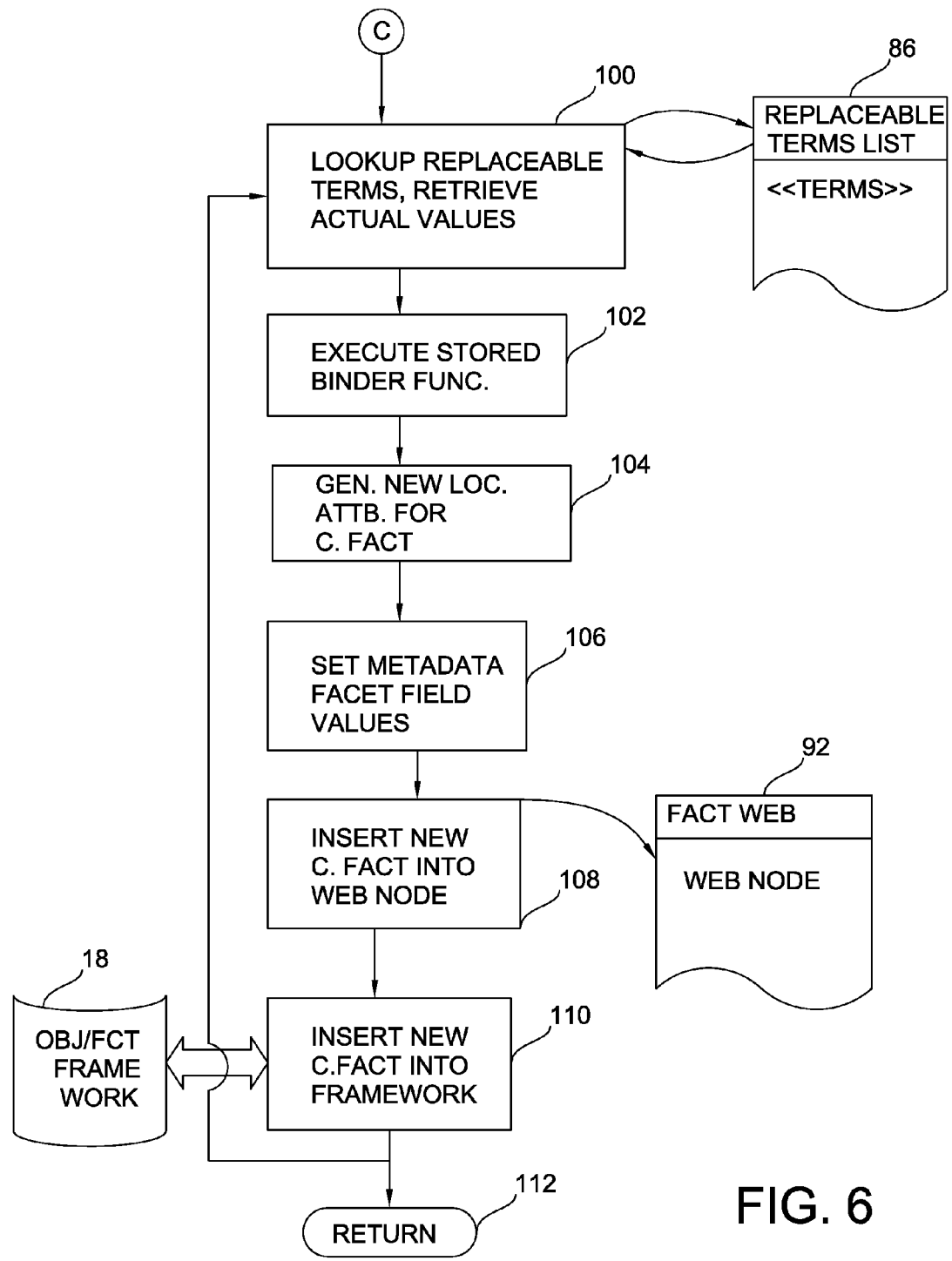
FIG. 6 is a continued schematic dataflow view of the forward reasoning routine.

Referring to FIG. 6, at step 100, the forward reasoning routine 58 looks up replaceable terms to retrieve actual values from the replaceable list 86. At step 102, the forward reasoning routine 58 executes the stored binder function to generate the location attributes for the known consequent fact.

At step 104, the new location attributes for the consequent facts are generated and then step 106, metadata facet field values are set, for example, the fact representation status, the fact how determined values. As an example, the "fact representation status" may equal "as expected". Also the "fact how determined" metadata value will be "deduced". Furthermore, a flag may be placed in the facet field value for flagging the fact as a fault making it true or false depending on the results.

At step 108, this information is inserted into a new consequent fact Web node 92.

At step 110, the new consequent fact is entered into the framework and then the reasoning routine re-applies the process to the next consequent node. Once all consequent nodes have been processed, a single rule has been successfully found and applied. The forward reasoning processes has generated one or several additional facts which correspond to the other antecedent nodes, and one or several facts which correspond to each of the consequent rule nodes. As a result, a number of additional facts have been added to the framework 18 during this forward reasoning routine process.

Figure 7:
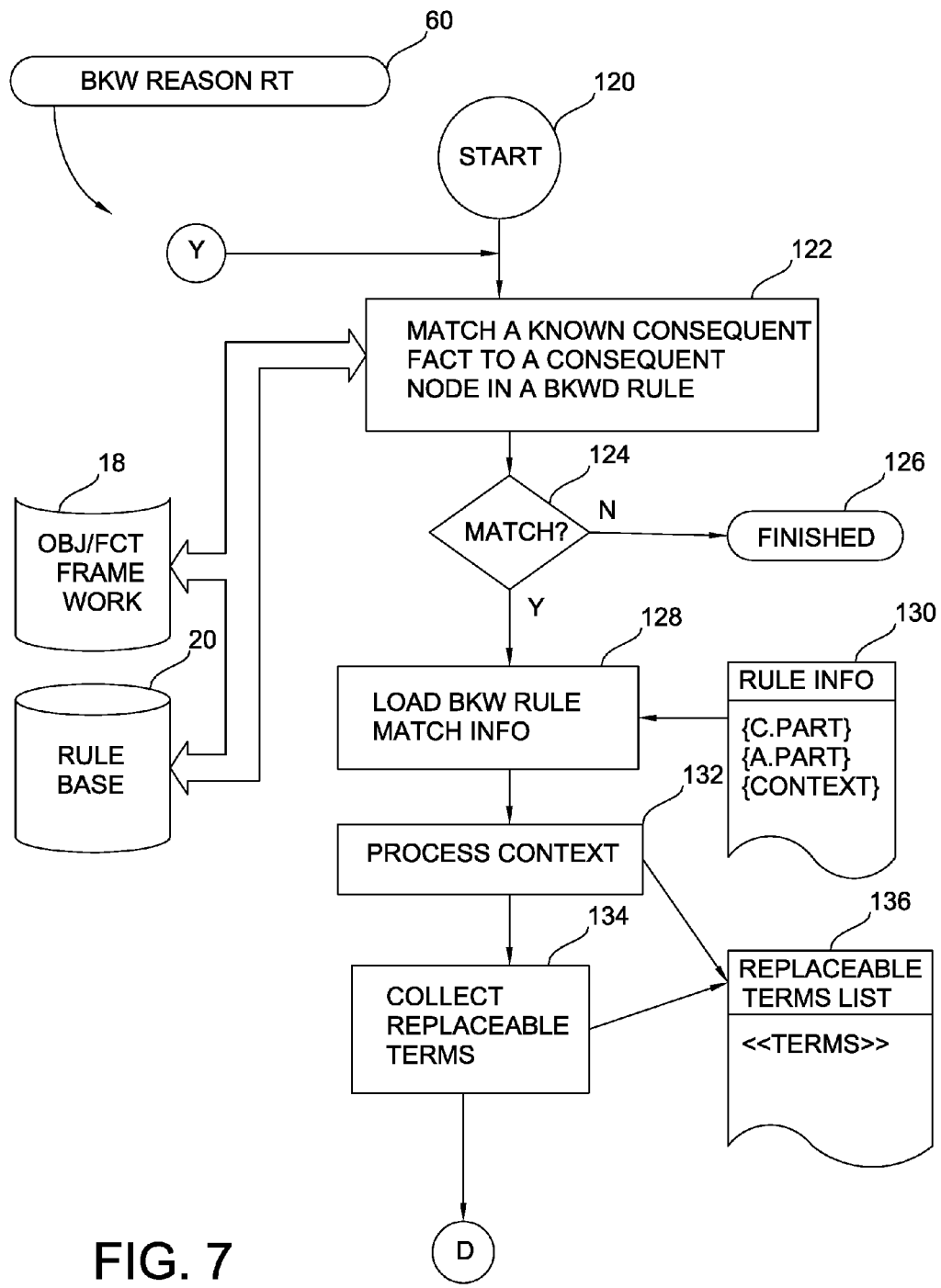
FIG. 7 it's a schematic dataflow view of the backward reasoning routine.

With the forward reasoning routine 58 complete, the coordination routine 52 then calls the backward reasoning routine 60 as seen FIG. 7. The backward reasoning routine generally starts with a single input fact, referred to as the "known consequent fact", usually representing an ending state of the subsidiary process, then searches for a matching rule in the rule base (the input fact must match a node within the consequent part of the rule), and then applies the rule by performing acquisition of additional facts needed to match other consequent nodes, for example by detection, and applies the rule by performing acquisition of additional facts that match antecedent nodes, and in some cases applies deduction to derive or generate a new fact or fact group which corresponds to the antecedent rule part. This process may include additional iterations in order to match additional backward rules and generate other new facts, and the process may include recursion to start the process over again from the beginning using newly generated antecedent facts.

This process starts at step 120 and at step 122, the backward reasoning routine matches a known consequent fact (for instance a user entered ending state fact (seed fact)) from the object/fact framework 18 against a node from a rule consequent part from a backward rule from the rule base 20. In order to accomplish this, the system performs a search of the subset of the rule base consisting of all backward rules, for a rule with a consequent node that matches the known consequent fact. At step 124, the backward reasoning routine queries if a match is found. If a match is not found then the loop is finished at step 126. If a match is found, then at step 128, the backward rule information 130 is retrieved. It includes the consequent part of the rule, the antecedent part of the rule, and the context.

With the rule information 130 pulled from the rule base 20, the backward reasoning routine processes the context at step 132 and adds replaceable terms to the replaceable terms list 136. Then the reasoning routine acquires one or more replaceable terms from the known consequent fact at step 134 and adds these replaceable terms to the replaceable terms list 136.

Figure 8:
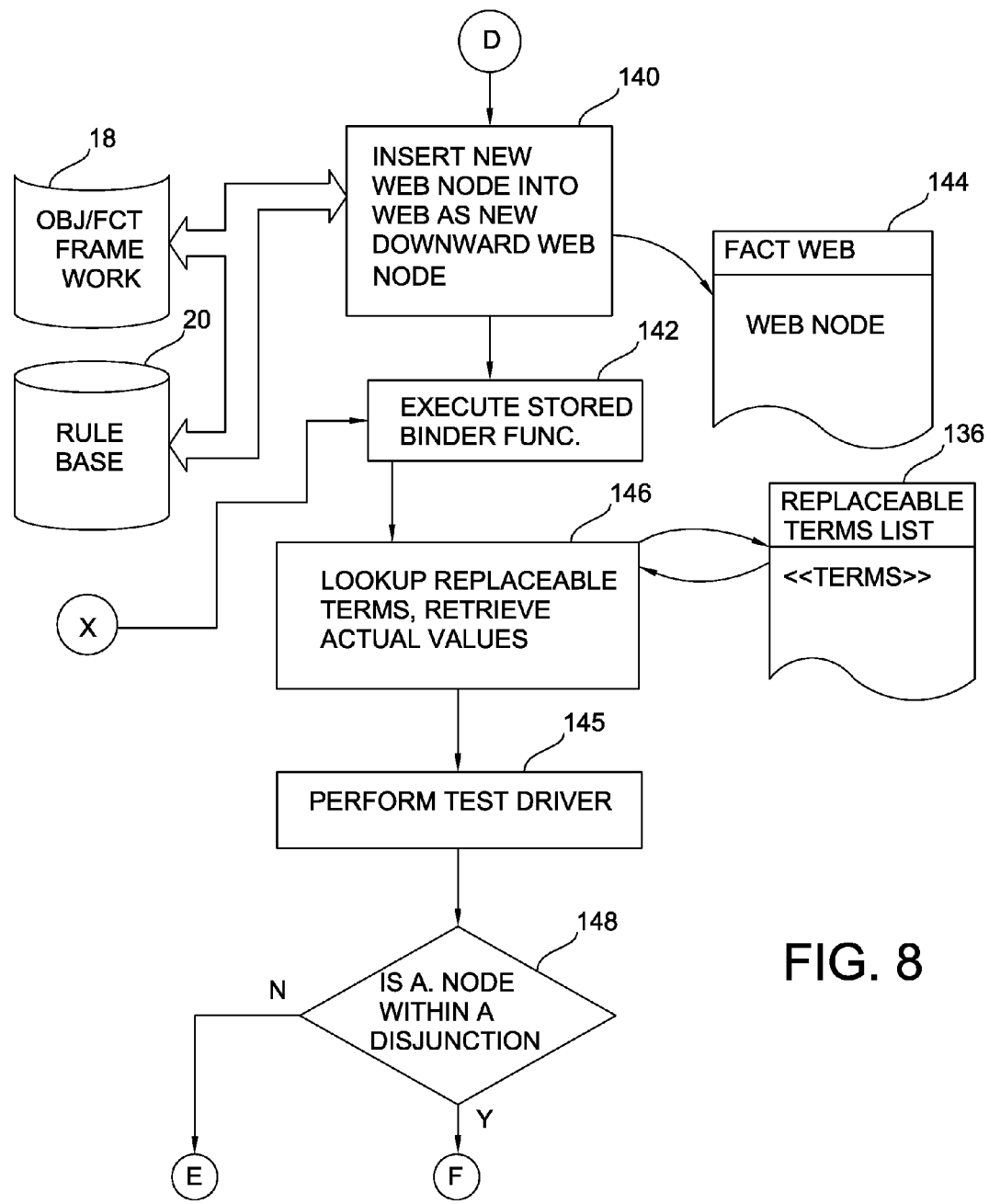
FIG. 8 is a continued schematic dataflow view of the backward reasoning routine.

Referring to FIG. 8, at step 140 a new web node is inserted into the web as a new downward web node within the fact web component 144. The backward reasoning routine executes a stored binder function at step 142. The stored binder function generates location attributes for the new antecedent fact. The backward reasoning routine then looks up at step 146 replaceable terms from the replaceable terms list 136, which retrieves actual values for the replaceable terms. At step 145, a perform test driver routine will attempt to determine if an antecedent fact corresponding to the antecedent node is a true fact or not.

Figure 9:
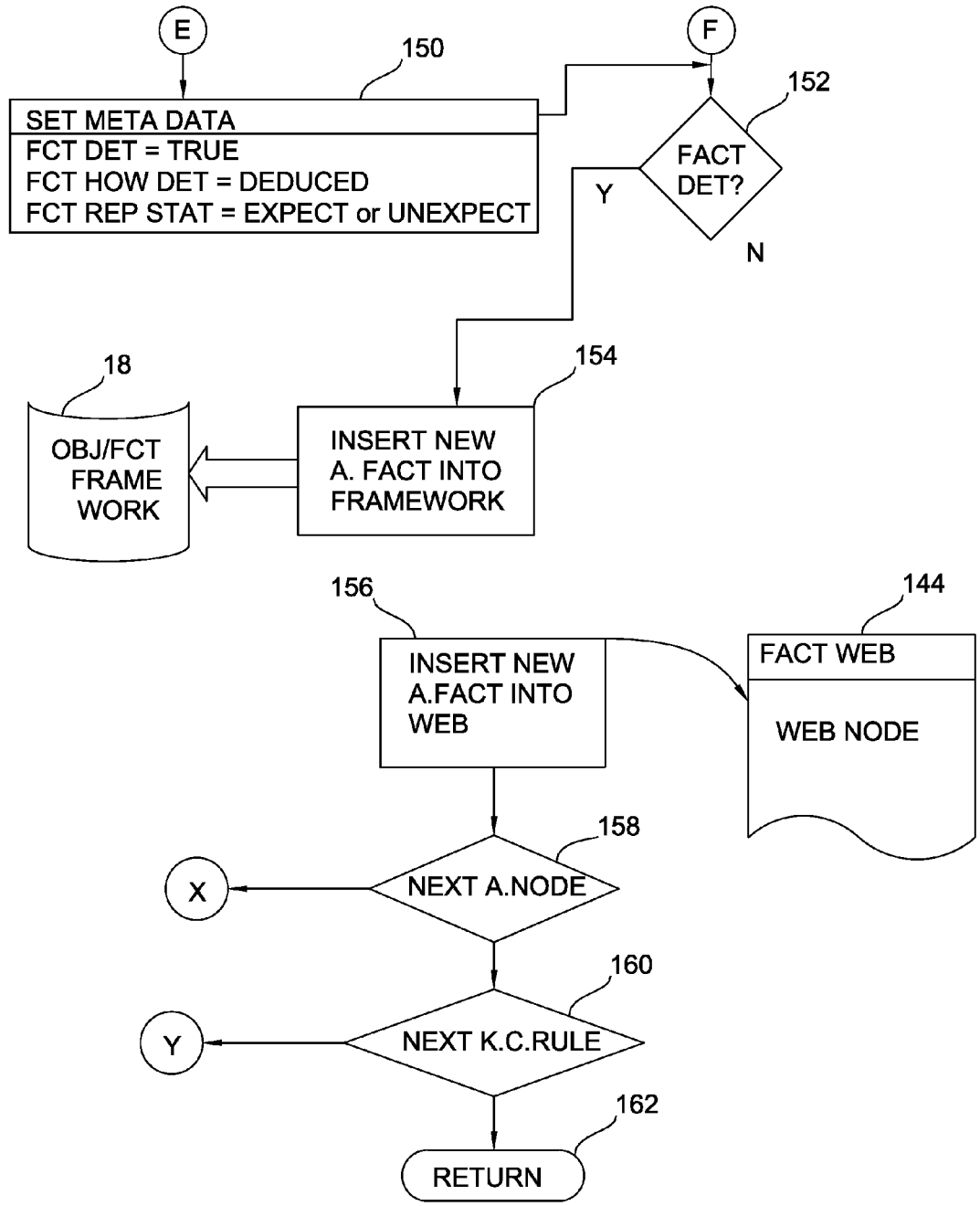
FIG. 9 is a continued schematic dataflow view of the backward reasoning routine.

The backward reasoning routine determines if the antecedent node is maintained within a disjunction at step 148. The antecedent node may be within a disjunction, this type of antecedent node which may be in a disjunction is considered a "hypothesis fact". If the antecedent node is not within a disjunction, then referring to FIG. 9, at step 150 the backward reasoning routine sets the metadata property field values as follows: flag the fact as been determined as="true"; flag the fact as representation status="as expected" or "unexpected"; flag fact how determined as "deduced". If the antecedent node is in a disjunction, then the backward reasoning routine queries whether or not the fact has been determined at step 152.

If the new antecedent fact has been determined, then it is inserted into the object/fact framework as a new fact. After the new fact has been placed in the object/fact framework, the new antecedent fact is entered into the web as an antecedent Web node within the fact web 144.

The backward reasoning routine then processes the next stored antecedent node, starting by executing the stored binder function 142, until each antecedent node has been processed at step 158. After each antecedent node has been processed, the subset of the rule base containing backward rules is searched for the next known consequent rule 160 which matches the particular input known consequent fact; it is processed, and this process is repeated until all known consequent rules have been used.

Referring back to FIG. 3, the reasoning engine executes the determine primary conclusion routine at step 64 as previously discussed, and then the system can generate the reasoning report at step 46.

In conclusion: the expert system is enabled to acquire or be given a set of input data that consists of facts that represent objects and attributes ("characteristics"/"features"/"qualities") of objects pertaining to a real-world domain, hereafter referred to as the "problem domain" or "domain"; the expert system is enabled to perform executable instructions (operations and calculations and functions) in order to generate new data that consists of additional not-previously-known facts about the problem domain, consisting of both acquired facts and facts that are the result of a reasoning process; the expert system is enabled to rely on a particular method of structured representation of facts about a domain instance; the expert system is enabled to rely on a particular method of structured representation of rules about the class of domains, which representation captures and represents causal features of the objects of the domain class such that the reasoning process that depends on the rules can be characterized as performing some elements of "deep reasoning".

An implementation or application of the expert system is a working software application that performs troubleshooting of computer communications network diagnostic tool failures. In particular it diagnoses failures that are reported by the DNS query tool "nslookup". A second application of the expert system is also a working software application called DNS Troubleshooter, that diagnoses client-side DNS query problems on Windows computers.

The expert system also allows for and requires the representation of rules as structured rules in that every rule contains a binder function that allows for the generation of a conclusion (which is either an antecedent fact group or a consequent fact group) from the premise fact such that each conclusion fact is fully described as to location; this allows for insertion of the new fact into the framework so as to satisfy a requirement for non-ambiguity of objects to which the fact applies. Such an object is said to be "multi-faceted" with respect to attributes.

The expert system also allows for the representation of rules involving the representation of a component of a rule called a rule node. A rule node represents a class of objects in the real world from the problem domain. The location attributes of such an object are specified using scalar (integer) dimension coordinates, such that no physical spatial or effective physical spatial part of any object may overlap any other physical spatial or effective physical spatial part of any other object that is represented within the same rule part.

The expert system also allows for and requires classes of objects to be represented by rule nodes such that the representational mechanism that is chosen for the representation of structure is subject to the assumption that each element therein is indivisible, or that where an element is an aggregation of component physical objects and thus divisible, an additional mechanism will be provide to facilitate handling the aggregate object.

The expert system also allows for and requires instances of the class of objects that is represented by a rule node to be transitory objects, i.e. such an object may only be said to exist at one instant in time, or for the duration of the smallest time duration that the time scale of the system allows; unless otherwise represented either by a "permanence" attribute or by a rule-base-wide permanence assumption.

The expert system also allows for and requires instances of the class of objects that is represented by a rule node to be fixed-location objects; an object that is represented is not capable of "motion" of any kind.

The expert system also allows for and requires the representation of a class of objects in a rule node to represent a minimal pre-defined set of attribute types; in all cases this must consists of a full set of location attributes and at least one value (quality) attribute.

The expert system also allows for and requires that the representation of facts be structured in that every fact that is represented is represented in such a structured way is to avoid ambiguity as to the location of the object which that fact represents so that no fact can be confused with another fact; this is accomplished through the use of a multi-dimension object/fact framework, or through the use of an attribute cluster approach. Where a framework approach is used, the framework resembles but is not necessarily identical to an (integer-based) Cartesian coordinate system, or matrix. (For example, an enumeration of general location values replaces the "X" coordinate, an enumeration of specific location values replaces the "Y" coordinate). The embodiment is extensible by adding further dimensions. The representation of objects in this fact representation scheme is said to be "multi-faceted" in that each object is represented by multiple attributes, and each object must have a complete set of location attributes and at least one quality attribute.

The expert system also allows for and requires the location attributes of any object to be specified using scalar (integer) dimension coordinates, such that no physical spatial or effective physical spatial part of any object may overlap any other physical spatial or effective physical spatial part of any other object that is represented within the same fact store.

The expert system also allows for and requires any object to be represented by a representational mechanism such that the representational mechanism that is chosen for the representation of structure is subject to the assumption that each element therein is indivisible, or that where an element is an aggregation of component physical objects and thus divisible, an additional mechanism will be provide to facilitate handling the aggregate object.

The expert system also allows for and requires an object to be a transitory object; unless otherwise represented either by a "permanence" attribute or by a fact-store-wide permanence assumption.

The expert system also allows for and requires an object to be a fixed-location object; where the object is not capable of "motion". Where an object has the permanence property with a value of "true", or there is a fact-store-wide permanence assumption, an object with multiple subsequent (time-varying) components is identified by a set of location attributes with fixed values.

The expert system also allows for and requires an object to be represented by a minimal pre-defined set of attributes; in all cases this consists of a full set of location attributes and at least one quality attribute.

I claim:

1. A system for representation of a real world problem situation said system comprising:
   a. a computer software process acquiring or capable of accepting a set of input data comprising: seed facts, said set of input data representing real world objects pertaining to a real-world problem situation;
   b. the computer software process generating new data consisting of additional not-previously-known facts about said real-world problem situation, said additional not-previously known facts comprising acquired facts and reasoned facts;
   c. the computer software process utilizing: a fact structured representation method representing a first group of facts about a problem situation; a rule structured representation method for representing a first group of rules about a class of problem situations;
   d. said computer software process representing a plurality of causal features of said problem situation such that a reasoning process results;
   e. said reasoning process further characterized as performing some elements of deep reasoning.

2. The system according to claim 1 wherein said facts representing real world objects further comprise attributes of said real world objects.

3. The system according to claim 1 wherein said real world problem situation further comprises: an instance of a problem domain.

4. The system according to claim 1 wherein said system further comprises: said computer software process generating said new data by performing executable instructions.

5. The system according to claim 1 wherein said class of problem situations further comprises: a problem domain.

6. The system according to claim 1 wherein said computer software application further comprises: a computer communication network diagnostic tool for troubleshooting failure.

7. The system according to claim 6 wherein said computer communication network diagnostic tool for troubleshooting failure further comprises: a tool for nslookup DNS name look-up failure diagnosis.

8. The system according to claim 6 wherein said computer communication network diagnostic tool for troubleshooting failure further comprises: a tool for DNS query failure diagnosis.

9. The system according to claim 1 wherein said computer software application further comprises: an expert system utilizing a domain specific model, said domain specific model configured to model said problem domain.

10. The system according to claim 9 wherein said domain specific model further comprises: a set of attribute type definitions, said attribute type definitions comprising an attribute type name, a set of attribute type values.

11. The system according to claim 10 wherein said attribute type name further comprises: a character string; said set of attribute type values further comprising: an enumerated list of constants; a set of integers; a character string.

12. The system according to claim 10 wherein said attribute type definitions are configured for representation of problem domain object classes and problem domain objects.

13. The system according to claim 12 wherein said problem domain object classes are configured for rules in a rule base.

14. The system according to claim 12 wherein said problem domain objects are configured for facts in a fact base.

15. The system according to claim 1 wherein said system further comprises:
   preliminary generation of a problem domain object class by:
   a. selecting a group of location attribute types from a location attribute super-type;
   b. selecting at least one quality attribute type from the quality attribute super type;
   c. restricting said object classes so that no object will spatially overlap any other object.

16. The system according to claim 15 wherein said group of location attribute types further comprise at least one general location attribute type, and at least one specific location attribute type.

17. The system according to claim 16 wherein said at least one general location attribute type together with said at least one specific location attribute type is further configured for full description and unique identification of said problem domain object.

18. The system according to claim 16 wherein said specific location attribute type is further configured for representation of a root spatial unit size object class.

19. The system according to claim 15 wherein said system further comprises: a quality attribute type.

20. The system according to claim 19 wherein said quality attribute type further comprises: an inherent static quality of a class of object.

21. The system according to claim 19 wherein said quality attribute type further comprises: an abstract representation of behavioral potential.

22. The system according to claim 1 wherein said structured representation of rules further comprises: a binder function enabled to generate a conclusion fact or set of facts from the fact or facts corresponding to a premise node or node group.

23. The system according to claim 22 wherein said conclusion fact or set of facts is further configured using the binder function wherein each fact comprises at least one location attribute.

24. The system according to claim 22 wherein said premise node group further comprises: an antecedent node group, a consequent node group.

25. The system according to claim 22 wherein said structured representation of rules further comprises: a conclusion node group further comprising an antecedent node group, a consequent node group.

26. The system according to claim 1 wherein said system further comprises: a fact framework for organization and storage of facts comprising said seed facts, said acquired facts and said reasoned facts.

27. The system according to claim 26 wherein said facts are further configured for a full description as to a fact location providing for insertion of said facts into said fact framework to satisfy a non-ambiguity requirement.

28. The system according to claim 1 wherein said structured representation of rules further comprises: a rule node comprising a real world class of objects derived from said problem domain.

29. The system according to claim 28 wherein said system further comprises: a rule node object class, said rule node object class comprising a representational mechanism for representation of structure.

30. The system according to claim 1 wherein said system further comprises: an individual unit spatial configuration wherein a rule node object class comprises a representational mechanism for representation of an indivisible structural element.

31. The system according to claim 30 wherein said system further comprises: a spatial derivative size configuration wherein said rule node object class further comprises an aggregate object mechanism for representation of an aggregation of multiple indivisible structural elements.

32. The system according to claim 30 wherein said system further comprises: a root unit temporal size configuration wherein said rule node object class is further configured as a representational mechanism for a transitory object, wherein said transitory object exists for a smallest time duration within said system.

33. The system according to claim 32 wherein said rule node object class is further configured as an object state.

34. The system according to claim 1 wherein said system further comprises: a fixed location object class comprising a rule node configured as a representational mechanism for a fixed location object wherein said fixed location object is static and incapable of motion.

35. The system according to claim 1 wherein said system further comprises: a required attribute type configuration comprising a rule node class object requiring a first set of predefined attribute types.

36. The system according to claim 35 wherein said first set of predefined attribute types further comprises: a first set of location attributes, at least one quality attribute.

37. The system according to claim 1 wherein said system further comprises: a state rule representing an element of causality pertaining to said problem domain.

38. The system according to claim 37 wherein said system further comprises: said state rule consisting of an antecedent part and a consequent part.

39. The system according to claim 38 wherein said antecedent part further comprises at least one rule node wherein said rule node represents an object having a time prior relationship to said all objects represented by rule nodes of the consequent part; and wherein said at least one rule node represents an object having a causal relationship to all objects represented by said rule nodes of said consequent part.

40. The system according to claim 38 wherein said antecedent part further comprises: a disjunction of at least two rule nodes.

41. The system according to claim 38 wherein said antecedent part further comprises: a conjunction of at least two rule nodes.

42. The system according to claim 38 wherein said consequent part further comprises at least one rule node wherein said rule node represents an object having a time subsequent relationship to said all objects represented by rule nodes of said antecedent part; and wherein said at least one rule node represents an object having a caused-by relationship with all objects represented by said rule nodes of said antecedent part.

43. The system according to claim 38 wherein said consequent part further comprises: an optional disjunction of at least two rule nodes.

44. A system according to claim 38 wherein said consequent part further comprises: a conjunction of at least two rule nodes.

45. The system according to claim 38 wherein said system further comprises: an object class state time prior condition wherein said rule nodes of said antecedent part must be time prior to said rule nodes of said consequent part.

46. The system according to claim 1 wherein said system further comprises a rule-based fact acquisition routine for determining a truth value for a hypothesis fact.

47. The system according to claim 46 wherein said rule-based fact acquisition routine further comprises a detection function configured to determine said truth value of said hypothesis fact automatically.

48. The system according to claim 46 wherein said rule-based fact acquisition routine further comprises: a perform test function comprising at least one set of optional input parameters comprising a first set of configurations for a performance test, and at least three output parameters; a first Boolean value comprising a general success value, a general failure value; a second Boolean value comprising a test success value, a test failure value, a third parameter comprising a quality attribute value.

49. The system according to claim 48 wherein said system further comprises: a perform test driver rule representing rearward causality and referencing said perform test function.

50. The system according to claim 1 wherein said system further comprises: a rule node negation symbol wherein a rule node state is negated.

51. The system according to claim 1 wherein said system further comprises: a forward state rule utilized by a forward directed reasoning function.

52. The system according to claim 51 wherein said forward state rule further comprises an antecedent rule part comprising rule nodes representing object states comprising a causes relationship to all object states represented by said rule nodes of a consequent rule part.

53. The system according to claim 52 wherein said fact corresponding to said consequent rule part comprises a fact representation status truth value determined by: determining if a true condition exists for an object state corresponding to an antecedent node; returning a true value for said fact representation status of said fact.

54. The system according to claim 52 wherein said fact corresponding to said consequent rule part comprises a fact representation status truth value determined by: determining if a true condition exists for an object state corresponding to an antecedent node; returning a degree of probability assigned to said fact representation status of said fact.

55. The system according to claim 52 wherein said rule nodes other than a known antecedent rule node of an antecedent rule part further comprises: a reference to a fact acquisition routine.

56. The system according to claim 1 wherein said system further comprises: a backward state rule utilized by a backward directed reasoning function.

57. The system according to claim 56 wherein said backward state rule further comprises a consequent rule part comprising rule nodes representing object states having a caused by relationship with all object states represented by the rule nodes of an antecedent rule part, except wherein such rule nodes of the antecedent part are members of a disjunction.

58. The system according to claim 56 wherein said backward state rule further comprises: at least one optional limiting initial condition configured to represent an object class state within an antecedent node temporal scope.

59. The system according to claim 1 wherein said system further comprises a rule base, said rule base configured to store a plurality of rules; said rule base configured to maintain a set of rule addition functions; said rule base configured to maintain a set of rule deletion functions; said rule base configured to maintain a first set of rule base search functions.

60. The system according to claim 59 wherein said first set of rule base search functions further comprises: a "find rule using one antecedent" search function configured for use by a forward directed reasoning routine to find a rule that matches an antecedent node against a known antecedent starting state fact.

61. The system according to claim 59 wherein said first set of rule base search functions further comprises: a "find rule using only consequent" search function configured for use by a backward directed reasoning routine to find a rule that matches a known consequent node against an ending state fact, said ending state fact a member of an input seed fact group.

62. The system according to claim 59 wherein said first set of rule base search functions further comprises: a "find rule using unknown antecedent" search function configured for use by a perform test driver routine to find a rule that matches an unknown antecedent fact.

63. The system according to claim 1 wherein said system further comprises an input seed fact group comprising said starting state fact.

64. The system according to claim 1 wherein said system further comprises a fact store, said fact store configured as an array for representation of an object fact framework.

65. The system according to claim 64 wherein said system further comprises a fact store, said fact store configured as a collection of attribute clusters.

66. The system according to claim 1 wherein said system further comprises a reasoning/fact acquisition engine comprising an import data component configured to load said input data into said system; a control driver configured to execute a first group of control strategy components for producing new facts via fact acquisition and reasoning.

67. The system according to claim 66 wherein said first group of control strategy components further comprises: a process atoms function; a process molecules function; a forward directed reasoning function; a backward directed reasoning function; a perform test driver function; a determine primary conclusion function; a report generation function.

68. The system according to claim 67 wherein said forward directed reasoning function further comprises: searching for a forward rule to match a first known antecedent fact; said forward rule comprising a first set of antecedent nodes, a first set of consequent nodes, and a first set of context nodes; matching said forward rule antecedent node to said first known antecedent fact; determining if all other antecedent facts are true; then determining a new set of facts based upon consequent nodes of the consequent rule part of said matching forward rule.

69. The system according to claim 68 wherein said system further comprises: determining if said first set of antecedent nodes are true by a fact acquisition function.

70. The system according to claim 68 wherein said system further comprises:
determining if said first set of consequent nodes are true by a deduction function.

71. The system according to claim 67 wherein said system further comprises: a recursive forward directed reasoning function configured to call itself and provide input determined facts as known antecedent facts.

72. The system according to claim 67 wherein said backward directed reasoning function further comprises: searching for a backward rule to match a first known consequent fact against a rule consequent part node; said backward rule comprising a first set of consequent part nodes, a first set of antecedent part nodes and a first set of context nodes; matching said backward rule consequent part node to said first known consequent fact; then determining a new set of antecedent facts based upon antecedent nodes of an antecedent rule part.

73. The system according to claim 72 wherein said antecedent rule part comprises a disjunction comprising a first set of disjunctive antecedent nodes.

74. The system according to claim 72 wherein said system further comprises: determining if said first set of antecedent nodes are true by a fact acquisition function.

75. The system according to claim 72 wherein said system further comprises: determining if said first set of antecedent nodes are true by a deduction function.

76. The system according to claim 67 wherein said system further comprises: a recursive backward directed reasoning function configured to call itself and provide as input a known consequent fact, said recursive backward directed reasoning function further configured to recurse while the application of the backward directed reasoning successfully finds matching rules and determines new facts based on application of the backward rule.

* * * * *